(12) United States Patent
Berland et al.

(10) Patent No.: US 7,682,494 B2
(45) Date of Patent: Mar. 23, 2010

(54) PROTON CONDUCTING MATERIALS AND DEVICES INCORPORATING THEM

(75) Inventors: Brian S. Berland, Morrison, CO (US); Sabina Gade, Littleton, CO (US); Ronald W. Schaller, Littleton, CO (US); Michael Schwartz, Boulder, CO (US)

(73) Assignee: ITN Energy Systems, Inc., Littleton, CO (US)

( * ) Notice: Subject to any disclaimer, the term of this patent is extended or adjusted under 35 U.S.C. 154(b) by 0 days.

(21) Appl. No.: 12/122,418

(22) Filed: May 16, 2008

(65) Prior Publication Data

US 2008/0245663 A1 Oct. 9, 2008

Related U.S. Application Data

(62) Division of application No. 10/844,830, filed on May 13, 2004, now abandoned.

(51) Int. Cl.
*C25B 13/04* (2006.01)
*H01B 1/08* (2006.01)
*B01D 53/22* (2006.01)

(52) U.S. Cl. .............. 204/295; 95/55; 95/56; 96/11; 252/518.1; 252/520.1; 252/520.2; 252/520.21; 423/263; 423/593.1

(58) Field of Classification Search .......... 95/55, 95/56; 423/248, 648.1, 263, 593.1; 252/520.2, 252/520.21, 520.1, 518.1; 204/295; 96/11
See application file for complete search history.

(56) References Cited

U.S. PATENT DOCUMENTS

| | | | |
|---|---|---|---|
| 5,366,712 A | 11/1994 | Violante et al. |
| 5,403,461 A | 4/1995 | Tuller et al. |
| 6,033,632 A | 3/2000 | Schwartz et al. |
| 6,235,417 B1 | 5/2001 | Wachsman et al. |
| 6,296,687 B2 | 10/2001 | Wachsman et al. |
| 6,572,837 B1 | 6/2003 | Holland et al. |
| 6,899,744 B2 | 5/2005 | Mundschau |
| 6,977,009 B2 | 12/2005 | Pan et al. |
| 7,001,446 B2 | 2/2006 | Roark et al. |
| 7,258,820 B2 | 8/2007 | Elangovan et al. |
| 2004/0241070 A1* | 12/2004 | Noh et al. ........... 423/263 |
| 2005/0031517 A1* | 2/2005 | Chan .................. 423/263 |

OTHER PUBLICATIONS

Balachandran, et al., Development of Proton-Conducting Membranes for Hydrogen Separation, NETL Publications—1998 Conference Proceedings; http://www.netl.doe.gov/publications/proceedings/98/98ps/ps2a-8.pdf.

(Continued)

*Primary Examiner*—Wayne Langel
(74) *Attorney, Agent, or Firm*—Lathrop & Gage LLP

(57) ABSTRACT

Materials for use in proton transport characterized by several formulas are disclosed. Mixed ion and electron conductors may include metals and/or ceramic electron conductors and a proton conducting material. Hydrogen separation membranes may include porous layers and an electrolyte layer including a proton conducting material and an electron conductor. Hydrogen separation membranes may be formed by thermal spray techniques. Hydrogen separation membranes may include a catalyst layer. A method of separating hydrogen from a mixed gas stream includes passing the mixed gas through a first porous layer to an electrolyte layer, dissociating protons and electrons, diffusing the protons and electrons through the electrolyte layer, recombining them, and passing molecular hydrogen through a second porous layer.

15 Claims, 1 Drawing Sheet

OTHER PUBLICATIONS

Gade, et al., Novel Composite Membranes for Hydrogen Separation in Gasification Processes in Vision 21 Plants, http://www.netl.doe.gov/coalpower/gasification/projects/gas-sep/docs/PCC%2002%20mss.pdf.

Labrincha, et al.; Protonic conduction in La2Zr2O7-based pyrochlore materials, Solid State Ionics 99 (1997) pp. 33-40.

Omata, et al., Electrical Properties of Proton-Conducting Ca2+-Doped in La2Zr2O7 with a Pyrochlore-Type Structure, Journal of the Electrochemical Society, 148 (6) (2001), pp. E252-E261.

Omata, et al., Infrared Absorption Spectra of High Temperature Proton Conducting Ca2+ Doped La2Zr2O7, Journal of the Electrochemical Society, 148 (12) (2001), pp. E475-E482.

Omata, et al., Water and hydrogen evolution properties and protonic conducting behaviors of Ca2+ doped La2Zr2O7 with a pyrochlore structure, Solid State Ionics 104 (1997) pp. 249-258.

Shimura, et al., Ionic conduction in pyrochlore-type oxides containing rare earth elements at high temperature, Solid State Ionics 86-88 (1996) pp. 685-289.

N. Bonanos, Oxide-based protonic conductors: point defects and transport properties,Solid State Ionics, vol. 145, Issues 1-4, Dec. 1, 2001, pp. 265-274.

S.V. Bhide et al., J. Electrochem Soc. 146 (1999), pp. 4386-4392, Stability of Ab'1/2B'1/2O3-Type Mixed Perovskite Proton Conductors.

R. Carneim and T.R. Armstrong, "Chemical Stability of Barium Cerate-Based High-Temperature Proton Conductors", presented at the 225th American Chemical Society National Meeting, Mar. 23-27, 2003, New Orleans, LA. pp. 302-303.

Select File History in related U.S. Appl. No. 10/844,830 dated Feb. 5, 2008 through Jul. 3, 2008, 25 pages.

\* cited by examiner

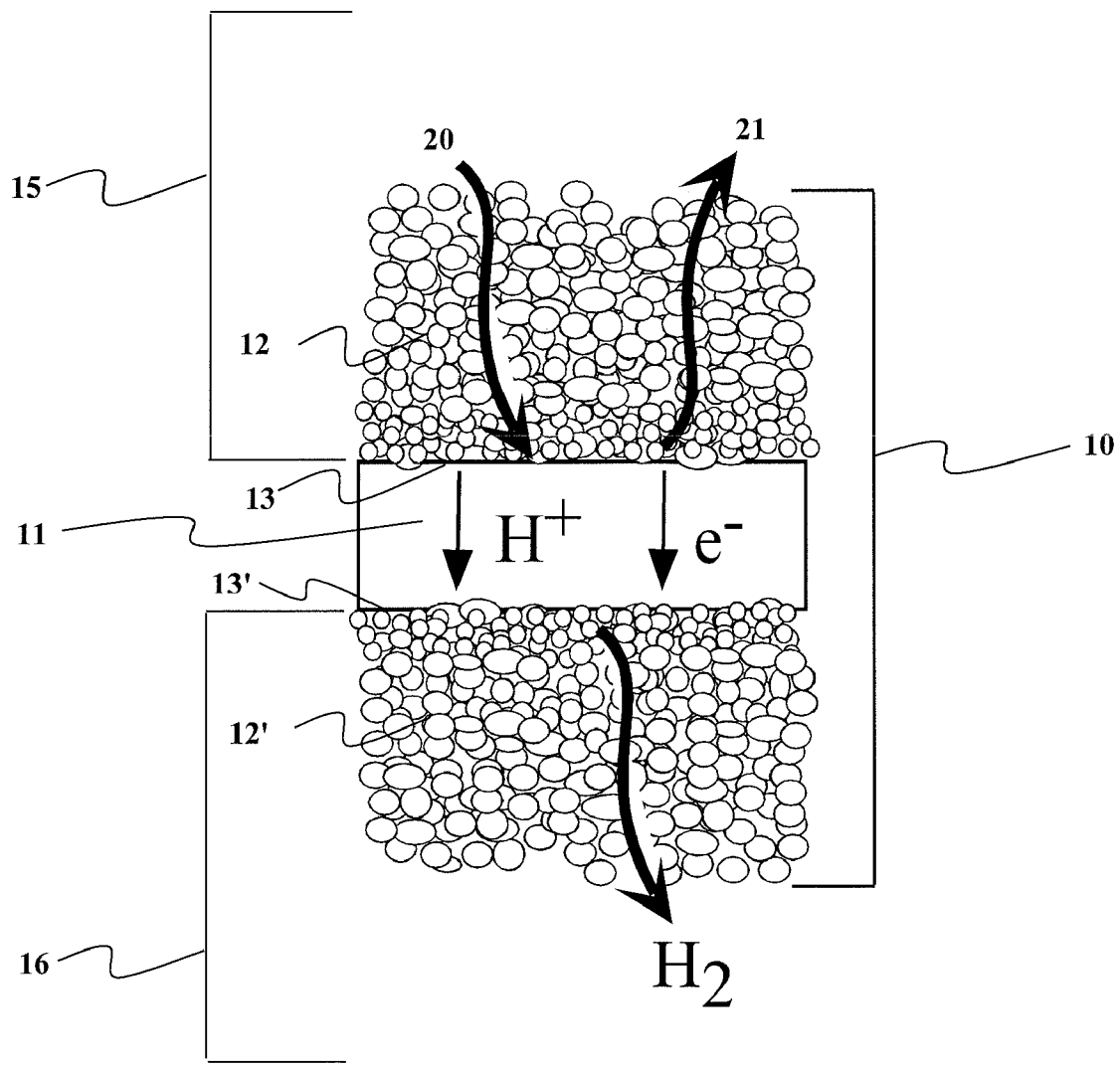

PROTON CONDUCTING MATERIALS AND DEVICES INCORPORATING THEM

CROSS-REFERENCE TO RELATED APPLICATIONS

This application is a divisional of U.S. patent application Ser. No. 10/844,830 filed 13 May 2004, now abandoned which is incorporated herein by reference.

BACKGROUND

Separation of hydrogen gas from mixed gas streams is useful in a variety of systems aimed at chemical purification, waste stream management, and energy production, storage and use. One example of hydrogen separation technology is pressure swing adsorption (PSA). One way of implementing PSA processes is by use of a blower that draws gas into an adsorbent vessel. The adsorbent vessel separates gas constituents by their affinity for the adsorbent. The system regenerates spent adsorbent by reducing the pressure in the adsorbent vessel to remove bound gasses. Adsorbent regeneration may be facilitated by thermal effects. The concept of separation by adsorption affinity is not limited to hydrogen gas and may include, for example, separation of carbon monoxide or other impurities.

Pressure related systems in the nature of PSA process are relatively expensive to install and maintain. Hydrogen removal by these devices may be thermodynamically inefficient and relatively expensive. Inefficiency of separation may also occur in cases where components of mixed gas flow streams have similar affinities for the adsorbent.

Another hydrogen separation technology involves the use of hydrogen selective membranes, which are generally made of one of three material classes: organic polymers, metals, and ceramics. In membrane separation, the hydrogen transport rate is proportional to the hydrogen partial pressure differential across the membrane and the hydrogen diffusion across the membrane. The hydrogen transport rate is inversely proportional to the thickness of the membrane. Hydrogen transport is also a function of temperature, and increases with increasing temperatures. For some materials that cannot withstand harsh environments of use, it is problematic that most large scale, industrial processes for the production of hydrogen operate at high temperatures, e.g., from 700° C. to 1200° C., and high pressures ranging from several hundred psi to 1000 psi.

Polymer membranes achieve separation via selective dissolution within the polymer of certain species within a mixed gas stream. The dissolved species are then transported across the membrane. A major drawback of these membranes is their limited thermal stability and poor mechanical strength, which renders them unsuitable at prevalent commercial operating conditions.

Metallic separation membranes are based on catalysis, for example, with Pd alloys. These materials transport hydrogen in atomic form. Hydrogen dissolves in the structure and diffuses across the membrane from one side to another under bias of partial pressure. After selective transport, the hydrogen emerges as molecular hydrogen, $H_2$. Although hydrogen transport is rapid in these systems, the alloys are expensive. The alloys may lack suitable thermal stability and/or mechanical properties for commercial operation at conventional high temperatures and pressures.

Ceramic membranes can be fabricated from thermally stable and mechanically strong inorganic materials and are thus more viable than polymer and metallic membranes at commercial operating conditions. These membranes may be divided into two general categories based on their transport mechanisms, namely, permselective transport and ion conducting transport.

Permselective membranes are fabricated with porosity on a nanometer scale. The porosity is sized or scaled to allow small molecules such as hydrogen to pass. The scale impedes passage of larger molecules. Surface chemistry processes, such as surface adsorption, may affect transport rates and aid in obtaining higher selectivities. One disadvantage of permselective membranes is that they are difficult to fabricate with control and repeatability over large surface areas. A very fine control of porosity is required to achieve high selectivity for hydrogen over other components in a mixed gas stream.

Ion conducting ceramic membranes ("ICCMs") operate by selectively transporting protons, i.e. hydrogen ions, across a membrane. The protons are formed by electrochemical reactions at a membrane surface for transport across the membrane under bias of partial pressure. The transport mechanism does not necessarily utilize nanostructured porosity, and the transport rate is affected by temporary electrostatic or bonding interactions as the protons pass through the ceramic lattice. Emerging hydrogen ions recombine with electrons to form molecular hydrogen, $H_2$. Selectivity for hydrogen transport may approximate 100% when the transport mechanism is based on proton conductivity and the membrane is not physically porous. Since ICCMs are fabricated from thermally stable and mechanically strong ceramics, they are compatible with the prevalent temperatures and pressures of commercial processing. The ceramics used in ICCMs are usually solid metal oxides. The crystal structure is frequently that of a perovskite or a pyrochlore.

Materials selection and design may require tradeoffs between various factors affecting the net rate of hydrogen transport across an ICCM hydrogen separation membrane, such as: (1) the area of the membrane, (2) the thickness of the membrane, (3) the rate of the electrochemical reactions at the input gas side, (4) the concentration of protons and electrons that the membrane is capable of holding in a dissociated state, (5) the mobility of the protons and electrons within the membrane, (6) the rate of the electrochemical reactions at the output gas side, and (7) the differential partial pressure of hydrogen gas across the membrane.

One such tradeoff is illustrated, for example, by using a larger area to increase hydrogen transport. The larger surface area undesirably increases the overall size and weight of the hydrogen separation system. In another example, using a thinner membrane may increase transport rates, but thinner membranes are vulnerable to hole formation in manufacture, as well as pressure ruptures in the commercial environment of use.

Hydrogen throughput of ICCMs may often be increased by raising the hydrogen partial pressure differential across the membrane. This raising of hydrogen partial pressure differential may be accomplished by (1) maintaining a high pressure of input gas and a low pressure of output gas, and/or (2) flushing the output gas surface with a carrier gas so that molecular hydrogen is promptly removed, lowering the partial pressure of hydrogen gas at the output side. With these available process controls, the remaining factors to improve proton throughput are materials related factors, such as concentrations and mobilities of protons and electrons within the membrane.

One class of ICCMs includes rare-earth-doped alkaline earth cerates, which are exemplified by gadolinium-doped barium cerate ($BaCe_{0.9}Gd_{0.1}O_{2.95}$) and yttrium-doped strontium cerate ($SrCe_{0.9}Y_{0.1}O_{2.95}$). These materials can be used to obtain high proton conductivities, but disadvantageously react with carbon dioxide to form barium or strontium carbonates, as the case may be. For the most part, industrial scale hydrogen production processes produce a mixed gas stream that contains carbon dioxide, and consequently, this class of ICCM suffers physical degradation by reacting with carbon dioxide in the intended environment of use.

A second class of ICCMs described in current literature is based on doped lanthanum zirconate, $La_2Zr_2O_7$. In yttrium-doped lanthanum zirconate, proton conductivity is enhanced relative to undoped lanthanum zirconate, but is unsuitably low for industrial applications. Calcium-doped lanthanum zirconate shows even lower proton conductivity. Structural problems may arise from the use of calcium-doped materials, such as formation of carbonates in the presence of carbon dioxide, as described above. Calcium materials may also be associated with formation of undesired phases, such as calcium zirconates.

U.S. Pat. No. 5,403,461 issued to Tuller et al ("Tuller") describes solid solutions that demonstrate ionic conductivity. Although specific element substitutions for enhancing ionic conductivity are disclosed, Tuller does not elaborate on the mechanism by which the disclosed substitutions enhance ionic conductivity. Also, the compounds and experimental investigations discussed in Tuller are directed exclusively to oxygen ion conductivity, rather than proton conductivity. Finally, the elemental formulae of Tuller are drawn so broadly as to cover an enormous spectrum of compounds, some of which have no known or useful ionic conductivity. For instance, equal utility under the same formula may be asserted for diverse compounds including lead oxide $Pb_3O_4$; lead iron tungstate $PbFe_{0.67}W_{0.33}O_3$ (a dielectric); yttrium aluminum garnet $Y_3Al_5O_{12}$ optionally doped with Nd or Ho, and yttrium orthovanadate $YVO_4$ (both laser materials); material yttrium iron garnet $Y_3Fe_5O_{12}$ (a ferromagnetic); $YBaCuO_7$, (a superconductor); and strontium barium niobate $SrBaNb_4O_{12}$ (a transparent ferroelectric).

As used herein, the terms "lanthanide elements" or "lanthanides" shall refer to elements including La, Ce, Pr, Nd, Pm, Sm, Eu, Gd, Tb, Dy, Ho, Er, Tm, Yb, and Lu.

SUMMARY

Materials for use in proton transport characterized by several formulas are disclosed. Mixed ion and electron conductors may include metals and/or ceramic electron conductors and a proton conducting material. Hydrogen separation membranes may include porous layers and an electrolyte layer including a proton conducting material and an electron conductor. Hydrogen separation membranes may be formed by thermal spray techniques. Hydrogen separation membranes may include a catalyst layer. A method of separating hydrogen from a mixed gas stream includes passing the mixed gas through a first porous layer to an electrolyte layer, dissociating protons and electrons, diffusing the protons and electrons through the electrolyte layer, recombining them, and passing molecular hydrogen through a second porous layer.

BRIEF DESCRIPTION OF DRAWINGS

The FIGURE shows a hydrogen separation membrane.

DETAILED DESCRIPTION OF DRAWINGS

The FIGURE shows a hydrogen separation membrane 10 composed of an electrolyte layer 11 between two porous layers 12 and 12'. A mixed gas stream 20, which may include molecular hydrogen $H_2$ and/or water vapor $H_2O$ and/or other components, is introduced into a space 15 which includes porous layer 12. The porous layer 12 is optional and is not strictly necessary, but is desirable. Porous layer 12 may be, for example, a metallic separation membrane, such as a Pd alloy. Alternatively, the porous layer 12 may be formed of a permselective ceramic membrane, or an ion transporting ceramic membrane. Porous layer 12 may be used to enhance or protect the functionality of electrolyte layer 11. By way of example, porous layer 12 may be used to prevent carbon dioxide form contacting the electrolyte layer 11 when the electrolyte layer 11 contains materials that react with carbon dioxide in a mixed gas stream 20. This benefit may be obtained by using a permselective or ion transporting material in porous layer 12.

Components of the mixed gas stream 20 enter the pores of layer 12, which is optionally configured to permit passage of all components of mixed gas stream 20 or selectively configured to permit passage of only desired components from mixed gas stream 20. $H_2$ may dissociate into protons $H^+$ and electrons $e^-$ by action of the electrolyte layer 11 at a surface 13. $H_2O$ may react with oxide ions in the lattice to form hydroxyl groups $OH^+$, wherein a proton is weakly bound to the oxide ion and moves easily to adjacent oxygen atoms. The other components of the mixed gas stream 20 do not interact with electrolyte layer 11, and remain in space 15. Protons and electrons diffuse across electrolyte layer 11 and recombine to form molecular hydrogen $H_2$ at a surface 13'. The molecular hydrogen $H_2$ formed at surface 13' thus becomes available within space 16.

It will be appreciated that the FIGURE shows one embodiment of a hydrogen separation membrane and is provided to show one possible use of materials for electrolyte layer 11. This teaching is by way of example and not by limitation. A variety of structures that use hydrogen separation membranes are known in the art and include, for example, fuel cells and any other use for hydrogen separation membranes.

Electrolyte layer 11 of the FIGURE may be in the form of a multiphase material in which one phase is a proton conducting material and the remaining phase(s) an electrical conductor. The electrical conductor may be either metallic or ceramic. The proton conducting material may have a crystal lattice structure, for example, the structures of perovskite or pyrochlore. The composition and lattice structure of the proton conducting material affect the proton concentration or distribution within the proton conducting material, as well as proton mobility through the proton conducting material.

There will now be shown and described materials for use in at least one of the electrolyte layer 11 and the porous layer 12. In one example, these materials provide excellent proton transport functionality when used as porous layer 12 and are resistant to gasses in combined flowstream 20 that would harm the electrolyte layer 11 if the electrolyte layer were exposed to the gasses. In this use, the porous layer 12 may be made of any material that is capable of proton transport, or a permselective material. The electrolyte layer 11 may then be a materials as described below. Alternatively, both the electrolyte layer 11 and the porous layer 12 may be made of a material as described below. In a third instance, the porous layer 12 may be made of a material as described below and the material of electrolyte layer 11 may be any material that is capable of proton transport, or a permselective material. In yet another option, the porous layer 12 or the electrolyte layer 11 may be a heterologous lattice formed by alternating deposition of ion transporting materials.

Without being bound by theory, it is prudent to acknowledge at least two possible mechanisms for incorporation of protons into a crystal lattice and resultant proton transport through the lattice. Each of these mechanisms is dependent on lattice properties that may be manipulated by tailoring the elements included in the lattice. The lattice properties that are manipulated in embodiments of the current invention are concentration of oxygen ions within the lattice, and basicity of the lattice.

A first proton incorporation mechanism may be written in chemical notation as Equation (1):

$$H_2O + V_O^{\cdot\cdot} + O_O^X = 2(OH)_O^{\cdot} \tag{1}$$

where $V_O^{\cdot\cdot}$ is an oxygen vacancy, $O_O^X$ is an oxide ion in an oxide ion position in the lattice, and $(OH)_O^{\cdot}$ is a hydroxyl group at an oxide ion position. The $^{\cdot}$ is a formal 1+ electron charge and $^X$ is formally neutral, where these states may be transient with proton passage at a particular location.

A second proton incorporation mechanism may be written as Equation (2):

$$\tfrac{1}{2}H_2 + h^{\cdot} + O_O^X = (OH)_O^{\cdot} \tag{2}$$

where $h^{\cdot}$ is an electron hole and the other symbols are defined above.

In Equations (1) and (2), the notation "$^{\cdot}$" is as defined above and is not intended as notation describing a radical, although the presence of a radical is not necessarily precluded. The hydroxyl groups $(OH)_O^{\cdot}$ are equivalent to protons with respect to proton conduction, as the H+ ion (proton) of the $(OH)_O^{\cdot}$ group is bound weakly to the oxygen atom, and moves easily to adjacent oxygen atoms in the crystal structure. This type of weak bonding may be considered as a transient electrostatic interaction, as opposed to a more permanent sigma or covalent bond.

Materials design may take Equations (1) and (2) into consideration and enhance proton incorporation by driving thermodynamics to favor one side of a reaction or another. Increased proton incorporation into the lattice is advantageously exploited by increased proton transport mobility that may be biased for greater throughput by increasing the hydrogen partial pressure differential across the membrane and/or by a voltage potential.

By way of example, proton incorporation may be enhanced by materials design selected to drive Equation (1) to the right. One way of doing this is to enhance proton incorporation by selecting materials to create additional $V_O^{\cdot\cdot}$. A fundamental lattice structure need not be altered to create these defects because regular lattice constituents may be substituted with atoms that have similar sizes with respect to those in the regular lattice, the substitute atoms having different oxidation states than the regular lattice constituents. This may be done without altering lattice structure or causing other structural problems, although the materials are tolerant if some structural differences result from the substitution. In line with this principle, one material property of a crystalline proton conducting material is defined as the material's oxygen vacancy concentration, i.e., $V_O^{\cdot\cdot}$ per unit volume. A related definition is the material's oxygen vacancy distribution, i.e., $V_O^{\cdot\cdot}$ per unit of surface area.

The oxygen vacancy concentration or distribution may be affected by the valences of metals in a crystalline structure. In the following discussion, the term "oxidation state" or "oxidation number" refers to the charge state(s) normally assumed by a given element when charge balancing is a consideration as the number of electrons that must be added to or subtracted from an atom to impart a balanced charge. For example, the pyrochlore $La_2Zr_2O_7$ is charge neutral, as the positive charges $2La^{3+}$ and $2Zr^{4+}$ total 14+, and this positive charge is offset by a negative charge $7O^{2-}$ totaling 14−. In this example, La has an oxidation state of 3, Zr that of 4+ and oxygen that of 2−. Substitution of other trivalent ions for $La^{3+}$, e.g., $Y^{3+}$ or any trivalent lanthanide results in no change to the overall charge balance.

In one example, $La_2Zr_2O_7$ may be doped by substituting $Zr^+$ with a trivalent metal, e.g., $Y^{3+}$ for the $Zr^{4+}$. By this substitution, the charge balance in the original formula $La_2Zr_2O_7$ changes in a manner that requires less oxygen to balance the formula charge. For every two such substitutions, each of which subtracts a +1 charge from the original charge balance, an oxygen atom (−2 charge) must be eliminated to maintain overall charge balance. Because the lattice structure changes as a result of losing this oxygen atom, and because the trivalent metal may position itself differently in the lattice, the addition of trivalent metal induces lattice defects, such as malformed unit cells and/or oxygen vacancies. These defects may affect the hydrogen transport rate across ceramic membranes formed of these materials.

As to these defects, the overall charge balance is zero in the substituted formula, but there are localized point charge defects. For example, the position in the lattice where an oxygen atom would reside in the original $La_2Zr_2O_7$ pyrochlore structure has a localized charge density of +2, because the −2 oxygen ion is not present due to one type of lattice defect. Such locations are the $V_O^{\cdot\cdot}$ oxygen vacancies discussed above. According to these principles, materials with content according to Formula (3) may provide useful proton transport functionality:

$$A_xB_yO_d, \tag{3}$$

wherein A is Y, or one or more lanthanide elements, or a mixture thereof; B is Zr, Ce, Hf, Th, or a mixture thereof, and the oxidation states of A and B are selected such that $x \ne y$, and d is a non-integer value when subscripts x and y are adjusted by a common multiplier such that the lesser of x and y is 2. With this adjustment, preferably, $0.75 < x/y < 1.5$. An absolute value quantity $|x-y|=0.05$, or sometimes $|x-y|=0.15$, and the quantity may be preferably $|x-y|=0.3$.

Because the concept of introducing defects leads to non-integer subscripts x, y and/or d, it is further useful to consider ratios of x and y for the corresponding effects these ratios have on the substituted formula. This may be done, for example, in context of Formula (3) by adding the constraint of $x/y > 1$, to induce oxygen vacancies associated with a deficit of B material or, in an alternative view, a surplus of A material. Alternatively, a constraint $x/y < 1$ may be imposed to induce oxygen vacancies associated with an absence of A material or, in an alternative view, a surplus of B material. The value d is consistent with balancing of the net formula charge.

The proton incorporation capacity of a lattice is influenced by at least two factors. These factors include the rate of proton incorporation into the crystal lattice, and the stability of the protons once incorporated. A material which cannot incorporate sufficient protons in its lattice has a low concentration of protons, hence, low proton transport rate resulting from low proton conductivity. The stability and rate of proton incorporation in a lattice depends on the basicity of the constituents of the lattice material where proton interaction with the lattice is viewed as localized acid-base interaction. Basicity is enhanced by inducing lattice point charge defects that may be charge-compensated by increasing the oxygen vacancies $V_O^{\cdot\cdot}$ according to Equation (1) above. For example, a $La_2Zr_2O_7$ lattice may be made more basic by substituting $Y^{3+}$ for $Zr^{4+}$, or $Ca^{2+}$ for $La^{3+}$. The substituted materials demonstrate a capacity for increased proton conductivity.

The lattice must not be too basic, however, as incorporated protons will become too strongly bound to the oxide ions in the lattice, reducing their mobility. It is also the case that introduction of too many lattice defects may result in failure of the lattice, or alteration of the lattice to another primary form. These effects may limit the x/y ratio to about 1.5 for improvement of proton conduction in cases where excess A material is added, or 0.75 in cases where excess B material is added.

The use of $Th^{4+}$ in substituting for $Zr^{4+}$ or $La^{3+}$ presents a special case wherein lattice defects may be induced by shell valence interactions even when substituted for $Zr^{4+}$. Radioactive decay of Th may induce other point charge defects.

Another embodiment of a proton conducting material is created from $La_2Zr_2O_7$ by increasing the electron holes h with the amount of oxygen in the lattice structure, according to Equation (2) above. For example, a departure from an original formula $La_2Zr_2O_7$ by substituting $Zr^{4+}$ or $Ce^{4+}$ for $La^{3+}$ results in materials with excess oxygen, presenting more sites at which protons may be stable within a lattice. This substitution may also be done according to Formula (3).

Formula (3) being a relatively simple case of these concepts in operation, other embodiments of proton conducting materials are created from the materials discussed above by incorporating oxygen vacancies or excess oxygen in the lattice, while enhancing basicity and preventing second phases from forming, by making materials slightly deficient in the A or B elements, or both. A third element may be selected from Groups IA through IVA, Groups IB through VIIIB, and the lanthanides, and mixtures thereof. The amount of the third element is limited to about 0.4 of the lesser of the A or B elements, to avoid formation of second or further phases. This results in materials of Formula (4):

$$A_xB_yC_zO_d, \quad (4)$$

wherein A is Y or one or more lanthanide elements, or mixtures thereof; B is Ti, Zr, Ce, Hf, or Th, or a mixture thereof; C is one or more elements from Groups IA through IVA of the Periodic Table, Groups IB through VIIIB of the Periodic Table, the lanthanides, and mixtures thereof. In this case, it is useful for formula comparison purposes to consider that in a universe of possible x and y subscripts, the lesser of x and y may be adjusted to a value of 2 by the application of a common multiplier to all subscripts x, y, z and d, in which case particularly useful values include those where these relationships are observed x and y vary according to $3.2 \leq x+y \leq 4.8$, $0 \leq z \leq 0.8$, and d takes a value consistent with balance of the net formula charge.

In a preferred sense, with regard to formula (4), the absolute value quantity $|x-y|=0.05$, or sometimes $|x-y|=0.15$, and the quantity may be preferably $0.3 \leq |x-y| \leq 2.8$.

The ICCM material may, for example, have a formula

$$A_xB_yC_zO_d, \text{ wherein:} \quad (5)$$

A is selected from Y, La, Ce, Pr, Nd, Pm, Sm, Eu, Gd, Tb, Dy, Ho, Er, Tm, Yb, Lu, and mixtures thereof, B is selected from Zr, Ce, or Hf; and mixtures thereof;

C is selected from Li, Be, B, carbon, Na, Mg, Al, Si, K, Ca, Sc, Ti, V, Cr, Mn, Fe, Co, Ni, Cu, Zn, Ga, Ge, Rb, Sr, Y, Nb, Mo, Tc, Ru, Rh, Pd, Ag, Cd, In, Sn, Cs, Ba, Ta, W, Re, Os, Tr, Pt, Au, Hg, Tl, Pb, Fr, Ra, La, Pr, Nd, Pm, Sm, Eu, Gd, Tb, Dy, Ho, Er, Tm, Yb, and Lu, and mixtures thereof;

x and y vary according to $3.2 \leq x+y \leq 4.8$, the subscripts x, y, z and d are normalized by the application of a common multiplier such that the lesser of x and y is 2, and $x \neq y$, z varies according to $0 \leq z \leq 0.8$; and d takes a value consistent with the oxidation states of A, B, and C and the stoichiometry x, y, and z to balance the net formula charge, and A and/or C are present in effective amounts for improving proton transport relative to $La_2Zr_2O_7$.

Cerium is a special case in Formula (5) due to its reactivity and may be separated from the A materials, such that A may be selected from Y, La, Pr, Nd, Pm, Sm, Eu, Gd, Tb, Dy, Ho, Er, Tm, Yb, Lu, and mixtures thereof. A smaller group of preferred C-type materials includes Li, Be, B, carbon, Na, Si, K, Sc, Zn, Ga, Ge, Rb, Tc, Ag, Cd, Cs, Ba, Ta, Re, Au, Hg, Tl, Fr, Ra, La, Pr, Nd, Pm, Sm, Eu, Gd, Tb, Dy, Ho, Er, Tm, Yb, and Lu, and mixtures thereof.

In one aspect, C may be a mixture of at least two of Li, Be, B, carbon, Na, Al, Si, K, Sc, Ti, V, Cr, Mn, Fe, Co, Ni, Cu, Zn, Ga, Ge, Rb, Y, Nb, Mo, Tc, Ru, Rh, Pd, Ag, Cd, In, Sn, Cs, Ba, Ta, W, Re, Os, Ir, Pt, Au, Hg, Tl, Pb, Fr, Ra, La, Ce, Pr, Nd, Pm, Sm, Eu, Gd, Tb, Dy, Ho, Er, Tm, Yb, and Lu. In another aspect, C may contain a small amount of Ca alone or in combination with other elements as described above, such as a portion of z less than 0.05 or 0.1 when z varies according to $0 \leq z \leq 0.8$.

Useful devices may incorporate the proton conducting materials discussed above in several ways. The FIGURE shows that both protons and electrons must cross membrane 11 so that they can reunite to form molecular $H_2$. Cases wherein a proton conductor is not also an electron conductor require another mechanism for electron conduction. One method of combining the proton conducting materials discussed above with electron conductors in a single material (a mixed ion and electron conductor, or "MIEC") is through physical mixtures. For example, a ceramic MIEC material may form from a proton conducting material in powder form mixed with a ceramic electron conducting material in powder form. Alternatively, ceramic-metallic ("cermet") MIEC material may form from a proton conducting material in powder form mixed with a powdered metal. Varying the proportion of the proton conducting material within ceramic or cermet MIEC materials from about 20-80 wt % results in the MIEC material retaining both proton conducting and electron conducting capabilities.

MIECs incorporating proton conducting materials may be fabricated into thin membranes on porous layers (i.e., porous layers 12 and 12' of the FIGURE). Thermal spray techniques may be used to fabricate an MIEC membrane directly on one porous layer, and a second porous layer may then be formed directly on the MIEC membrane, or a second porous layer may be fabricated separately and positioned adjoining the MIEC membrane. An MIEC membrane may be mechanically roughened on one or both sides adjoining porous layers. The surface of a porous layer may contact an MIEC membrane directly, as shown in the FIGURE, or other membranes or layers may be interposed between the MIEC membrane and porous layers. For example, thin layers of nickel, ceramics, or catalysts may exist between an MIEC layer and either or both porous layers. Suitable catalysts may include, for example, nickel, titanium, tungsten, platinum, and palladium. The proton conducting materials discussed above, and MIECs incorporating them, may be used in a variety of end products such as hydrogen separation membranes, electrochemical hydrogen compressors, hydrogen purification devices, electrolytic hydrogen production devices, hydrogen sensors, and fuel cells.

The ceramic membrane materials described above may be made using standard techniques for making metal oxides according to the compositions shown and described. Ceramic bodies may be formed, for example, by sintering in an oxygen-containing atmosphere. Thick or thin films may be formed using sol gels where a metal organic precursor is applied to a porous substrate, such as a nanoporous, microporous, milliporous, or mesoporous substrate to fill the voids, or a metal screen may be coated with the material to fill the mesh. The sintering conditions used to form metal oxides preferably constitute an anneal process, such that the temperature and time in use are sufficient to form crystal grains. The size of the grains is not necessarily important, although larger grains are preferred. Generally, an anneal profile of from 1400° C. to 1500° C. is suitable for these purposes when forming thick ceramic bodies, for example, from powders that have been prepared by the Pechini method. A different profile of from 400 to 800° C. may be suitable for thick and thin films.

The working example that follows teaches by way of example and not by limitation. In setting forth preferred materials and methods, the example should not be unduly construed as limiting the claims.

Example 1

Ceramic Powder $La_{1.8}Zr_{2.2}O_{7.1}$

A powder of composition $La_{1.8}Zr_{2.2}O_{7.1}$ was prepared by the Pechini method. Aqueous solutions of the respective La and Zr metal nitrates were mixed to form a single solution with La and Zr metal content in a 1.8:2.2 molar ratio. A second solution containing citric acid and ethylene glycol in a 1:1 molar ratio was added to the solution with stirring. The solution was heated slowly to remove water at approximately 100° C., and the solution gelled. Heating continued by slowly ramping up the temperature until decomposition of the nitrates began, as indicated by the evolution of a dark gas from the solution. Temperature was maintained at this plateau until the gel became a fine powder. The powder was homogenized by placement into a high temperature furnace where heating occurred at 900° C. in air for two hours.

Example 2

Hydrogen Separation Membrane

Hydrogen separation membranes were formed including the proton conducting material $La_{1.8}Zr_{2.2}O_{7.1}$ and electrically conducting nickel. The powder of Example 1 was mixed with commercially obtained nickel powder in a 1:1 weight ratio (w/w). The mixture was ball-milled for twenty four hours. A suitable binder, a mixture of polyethylene glycol and polyvinyl alcohol (50:50 by weight), was added dry at approximately 1 percent by weight of the powder, and the mixture was further wet-milled and subsequently dried in air. The resulting powder was sieved through a #50 US mesh, placed in cylindrical disks, and pressed at 40,000 psi to yield a disk approximately 1 mm thick and 57 mm in diameter. The disks were placed in a furnace and fired in air at 300° C. to remove the binder. Subsequent firing ensued in an atmosphere of 3% $H_2$ in Ar at 1420 to 1460° C. to obtain dense membrane disks. Actual density was greater than 90% of theoretical solid density. Porosity was less than 5%.

Hydrogen transport was confirmed by sealing the membranes in respective metal holders, such that the circular perimeter was sealed to expose two flat surfaces. In different instances, the seal was accomplished by brazing a disk into the holder using a commercial braze, by forming a seal using Pyrex glass rings, using Pyrex glass powder, and by using a gold gasket. The sealed membranes were connected to gas feed and exit tubes, placed in a furnace, and heated under a hydrogen-containing atmosphere of 50% $H_2$ in $N_2$ at 900 to 950° C.

One flat surface of each membrane was exposed to the hydrogen-containing atmosphere, and the other surface was exposed to a helium gas stream. The concentration of $H_2$ in the He stream was measured by standard chromatography. Care was taken to subtract for leakage across the seal by deducting an amount of $H_2$ equal to the amount of $N_2$ in the He stream. The flow rates of the respective streams were measured using a soap film flowmeter and confirmed by a mass flowmeter. From the concentration of the $H_2$ and flow rate of the He stream, a flux rate of 0.32 ml/min-cm² was measured at 900° C.

Proton transport rate and conductivity were calculated from Equations $$J = \frac{\sigma_{amb} RT}{4F^2 l} \ln \frac{P_{out}}{P_{in}} \quad (6)$$

$$\sigma_{amb} = \frac{(\sigma_{ion})(\sigma_{elec})}{\sigma_{ion} + \sigma_{elec}} \quad (7)$$

where J is the flux rate in mol/cm²-sec, $\sigma_{amb}$ is the ambipolar conductivity in S/cm, R is the Molar Gas constant, T is the absolute temperature, F is Faraday's constant, l is the thickness, $P_{out}$ and $P_{in}$ are the partial pressures in the permeate (transported gas stream) and feedstreams, respectively, and $\sigma_{ion}$ and $\sigma_{elec}$ are respectively the ionic (proton) and electronic conductivities.

Using Equations (6) and (7), a conductivity of $1.7 \times 10^{-2}$ S/cm was measured for $La_{1.8}Zr_{2.2}O_{7.1}$ at 900° C. This conductivity is better than an order of magnitude improvement over the values of $1 \times 10^{-5}$ S/cm for $La_2Zr_2O_7$ and $2 \times 10^{-3}$ S/cm for $La_2Zr_{1.8}Y_{0.2}O_{6.9}$ measured at 900° C. as reported by Shimura et al., Solid State Ionics, 86-88, 685 (1996).

Example 3

$La_{2.0}Zr_{1.95}O_{6.9}$ Membrane

Powders of the proton conducting material $La_{2.0}Zr_{1.95}O_{6.9}$ were prepared using this metals stoichiometry in the same manner of process as reported previously in Example 1. Membranes that contained 50% each by weight of $La_{2.0}Zr_{1.95}O_{6.9}$ and nickel were prepared in the same manner of process as described in Example 2. The membranes were tested for hydrogen flux as described in Example 2 and a flux rate of 0.80 ml/min-cm was measured at 900° C. Using Equations (6) and (7), a conductivity of 0.12 S/cm was calculated for this material.

Example 4

$La_{1.8}Zr_{2.2}O_{7.1}$—Additional Testing

Powder of the proton conducting $La_{1.8}Zr_{2.2}O_{7.1}$ material prepared in Example 1 was mixed with nickel powder at a 1:1 ratio by weight. The mixture was placed in a tube furnace. A gas stream of 50% $H_2$ in $CO_2$ flowed over the powder mixture while the furnace was heated to 900° C. for six hours. After heating, the material was cooled in the same atmosphere. The powder sample was examined visually and showed no signs of chemical reaction between the $La_{1.8}Zr_{2.2}O_7$ and the $CO_2$. Comparative X-ray diffraction results between the starting $La_{1.8}Zr_{2.2}O_{7.1}$ materials and the ending materials indicated no changes from the original starting material. This result confirms that the $La_{1.8}Zr_{2.2}O_{7.1}$ material is stable under industrial operating conditions that are likely to be encountered in the intended environment of use for various industrial applications.

Insubstantial changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A material for use in proton transport, comprising a formula $A_xB_yC_zO_d$, wherein:
   A is selected from a group consisting of Y, La, Ce, Pr, Nd, Pm, Sm, Eu, Gd, Tb, Dy, Ho, Er, Tm, Yb, Lu, and mixtures thereof,
   B is selected from a group consisting of Zr, Ce, Hf, and mixtures thereof;
   C is selected from a group consisting of Li, Be, B, C, Na, Mg, Al, Si, K, Ca, Sc, Ti, V, Cr, Mn, Fe, Co, Ni, Cu, Zn, Ga, Ge, Rb, Sr, Y, Nb, Mo, Tc, Ru, Rh, Pd, Ag, Cd, In, Sn, Cs, Ba, Ta, W, Re, Os, Ir, Pt, Au, Hg, Tl, Pb, Fr, Ra, La, Pr, Nd, Pm, Sm, Eu, Gd, Th, Dy, Ho, Er, Tm, Yb, Lu, and mixtures thereof;
   x and y vary according to $3.2 \leq x+y \leq 4.8$, the subscripts x, y, z and d are adjusted by a common multiplier so that $x \neq y$,
   z varies according to $0 \leq z \leq 0.8$, and wherein if z=0, A and B are different materials; and
   d takes a value consistent with the oxidation states of A, B, and C and the stoichiometry x, y, and z to balance the net formula charge, and A and/or C are present in effective amounts for improving proton transport relative to $La_2Zr_2O_7$.

2. The material of claim 1, wherein B is Ce.

3. The material of claim 2, wherein:
   A is selected from a group consisting of Y, La, Pr, Nd, Pm, Sm, Eu, Gd, Tb, Dy, Ho, Er, Tm, Yb, Lu, and mixtures thereof; and
   C is selected from a group consisting of Li, Be, B, C, Na, Si, K, Sc, Zn, Ga, Ge, Rb, Tc, Ag, Cd, Cs, Ba, Ta, Re, Au, Hg, Tl, Fr, Ra, La, Pr, Nd, Pm, Sm, Eu, Gd, Tb, Dy, Ho, Er, Tm, Yb, and Lu, and mixtures thereof.

4. A material for use in proton transport, comprising a formula $A_xB_yC_zO_d$, wherein:
   A is selected from a group consisting of Y, La, Ce, Pr, Nd, Pm, Sm, Eu, Gd, Th, Dy, Ho, Er, Tm, Yb, Lu, and mixtures thereof;
   B is Zr, Ce, or Hf, or a mixture thereof;
   C is a mixture of at least two members selected from the group consisting of Li, Be, B, carbon, Na, Mg, Al, Si, K, Ca, Sc, Ti, V, Cr, Mn, Fe, Co, Ni, Cu, Zn, Ga, Ge, Rb, Sr, Y, Nb, Mo, Tc, Ru, Rh, Pd, Ag, Cd, In, Sn, Cs, Ba, Ta, W, Re, Os, Ir, Pt, Au, Hg, Tl, Pb, Fr, Ra, La, Pr, Nd, Pm, Sm, Eu, Gd, Tb, Dy, Ho, Er, Tm, Yb, and Lu;
   x and y vary according to $3.2 \leq x+y \leq 4.8$, the subscripts x, y, z and d are adjusted by a common multiplier so that $x \neq y$;
   z varies according to $0 \leq z \leq 0.4$; and
   d takes a value consistent with the oxidation states of A, B, and C and the stoichiometry x, y, and z to balance the net formula charge, and A and/or C are present in effective amounts for improving proton transport relative to $La_2Zr_2O_7$.

5. A material for use in proton transport, comprising a formula $ABC_zO_d$, wherein:
   A is selected from a group consisting of Y, La, Ce, Pr, Nd, Pm, Sm, Eu, Gd, Tb, Dy, Ho, Er, Tm, Yb, Lu, and mixtures thereof;
   B is Zr, Ce, or Hf, or a mixture thereof;
   C is selected from a group consisting of Li, Be, B, carbon, Na, Mg, Al, Si, K, Ca, Sc, Ti, V, Cr, Mn, Fe, Co, Ni, Cu, Zn, Ga, Ge, Rb, Sr, Y, Nb, Mo, Tc, Ru, Rh, Pd, Ag, Cd, In, Sn, Cs, Ba, Ta, W, Re, Os, Ir, Pt, Au, Hg, Tl, Pb, Fr, Ra, La, Pr, Nd, Pm, Sm, Eu, Gd, Tb, Dy, Ho, Er, Tm, Yb, and Lu, and mixtures thereof;
   z varies according to $0 \leq z \leq 0.8$; and
   d takes a value consistent with the oxidation states of A, B, and C and the stoichiometry z to balance the net formula charge, and A and/or C are present in effective amounts for improving proton transport relative to $La_2Zr_2O_7$.

6. A material for use in proton transport, comprising a formula $A_xB_yC_zO_d$, wherein:
   A is selected from a group consisting of Y, La, Ce, Pr, Nd, Pm, Sm, Eu, Gd, Tb, Dy, Ho, Er, Tm, Yb, Lu, and mixtures thereof;
   B is Th, optionally admixed with one or more of Ti, Zr, Ce, or Hf;
   C is selected from a group consisting of elements of Groups IA through IVA, elements of Groups IB through VIIIB, La, Ce, Pr, Nd, Pm, Sm, Eu, Gd, Tb, Dy, Ho, Er, Tm, Yb, Lu, and mixtures thereof;
   x and y vary according to $3.2 \leq x+y \leq 4.8$;
   $0.75 \leq x/y \leq 1.5$;
   z varies according to $0 \leq z \leq 0.8$; and
   d takes a value consistent with the oxidation states of A, B, and C and the stoichiometry x, y, and z to balance the net formula charge, and A and/or C are present in effective amounts for improving proton transport relative to $La_2Zr_2O_7$.

7. A material for use in proton transport, comprising a formula $A_xB_yC_zO_d$, wherein:
   A is selected from a group consisting of Y, La, Ce, Pr, Nd, Pm, Sm, Eu, Gd, Tb, Dy, Ho, Er, Tm, Yb, Lu, and mixtures thereof;
   B is Ti, optionally admixed with an element selected from the group consisting of Zr, Ce, Hf, Th, and combinations thereof;
   C is selected from a group consisting of Li, Ba, Be, B, carbon, Ce, Na, Si, K, Sc, Ti, V, Cr, Mn, Fe, Co, Ni, Cu, Zn, Ga, Ge, Rb, Y, Zr, Nb, Mo, Tc, Rh, Pd, Ag, Cd, Sn, Cs, Ba, Hf, Ta, W, Re, Os, Ir, Pt, Au, Hg, Tl, Pb, Fr, Ra, La, Ce, Pr, Nd, Pm, Sm, Eu, Gd, Tb, Dy, Ho, Er, Tm, Yb, and Lu, and mixtures thereof;

x and y vary according to $1.6 \leq x+y \leq 2.4$ and $0.75 \leq x/y \leq 1.5$;

z varies according to $0 \leq z \leq 0.4$; and d takes a value consistent with the oxidation states of A, B, and C and the stoichiometry x, y, and z to balance the net formula charge, and A and/or C are present in effective amounts for improving proton transport relative to $La_2Zr_2O_7$.

8. A mixed ion and electron conductor comprising a mixture of a ceramic electron conductor and a material from any one of claims 1-7.

9. A mixed ion and electron conductor comprising a mixture of a metal and a material from any one of claims 1-7.

10. A hydrogen separation membrane comprising a first porous layer, an electrolyte layer, and a second porous layer, the electrolyte layer being composed of a material from any one of claims 1-7 and an electron conductor.

11. The hydrogen separation membrane of claim 10, wherein the first porous layer comprises a catalyst.

12. The hydrogen separation membrane of claim 10, wherein the first porous layer is a permselective membrane.

13. The hydrogen separation membrane of claim 10, wherein the first porous layer comprises a material capable of transporting protons by lattice interaction with the protons.

14. The material of claim 1, wherein A, B, and C are different elements from one another.

15. The material of claim 1, wherein the material is $La_{1.8}Zr_{2.2}O_{7.1}$ or $La_2Zr_{1.95}O_{6.9}$.

* * * * *

UNITED STATES PATENT AND TRADEMARK OFFICE
CERTIFICATE OF CORRECTION

PATENT NO. : 7,682,494 B2
APPLICATION NO. : 12/122418
DATED : March 23, 2010
INVENTOR(S) : Brian S. Berland et al.

It is certified that error appears in the above-identified patent and that said Letters Patent is hereby corrected as shown below:

Column 4, Line 10, "form" should read --from--; Line 56, "materials" should read --material--;

Column 6, Line 1, "3, Zr" should read --3+, Zr--; Line 6, "$Zr^+$" should read "$Zr^{4+}$";

Column 7, Line 48, "observed" should read --observed.--; Line 67, "Re, Os, Tr," should read --Re, Os, Ir,--;

Column 10, Line 65, "ml/min-cm" should read --ml/min-$cm^2$--;

Column 11, Line 12, "$La_{1.8}Zr_{2.2}O_7$" should read --$La_{1.8}Zr_{2.2}O_{7.1}$--;

Lines 41 and 65 "Th, Dy," should read --Tb, Dy,--.

Signed and Sealed this

Eleventh Day of May, 2010

David J. Kappos
*Director of the United States Patent and Trademark Office*